United States Patent Office 3,043,874
Patented July 10, 1962

3,043,874
4-HALO-3-SULFAMOYLBENZOIC ACID DERIVATIVES AND METHODS FOR PRODUCING SAME
Horace A. De Wald and Milton L. Hoefle, Ann Arbor, Mich., assignors to Parke, Davis & Company, Detroit, Mich., a corporation of Michigan
No Drawing. Filed May 9, 1960, Ser. No. 27,487
11 Claims. (Cl. 260—556)

The present invention relates to novel derivatives of 4-halo-3-sulfamoylbenzoic acid and to methods for producing same. More particularly, the 4-halo-3-sulfamoylbenzoic acid derivatives with which the present invention is concerned have the following general formula

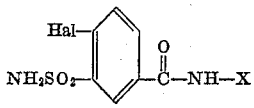

wherein Hal represents a bromine or chlorine atom and X represents lower alkoxy,

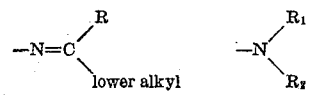

or

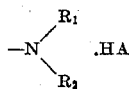

where R represents hydrogen or a lower alkyl radical; $R_1$ and $R_2$ each represents hydrogen or a lower alkyl radical or in combination with

represent a monocyclic heterocyclic radical having fewer than 6 carbon atoms such as the morpholino, methylmorpholino, pyrrolidino, methylpyrrolidino or piperidino radical; and A represents one equivalent of a non-toxic anion. Some typical examples of non-toxic anions for purposes of the invention are the anions furnished by hydrochloric, hydrobromic, sulfuric, phosphoric, sulfamic, p-toluenesulfonic, acetic, lactic, citric, propionic acids and the like. Preferred lower alkyl radicals are methyl, ethyl and propyl.

In accordance with the invention, the novel compounds of the above formula wherein X represents lower alkoxy,

or

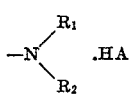

and $R_1$ and $R_2$ are the same and represent hydrogen or lower alkyl or in combination with

represent a heterocyclic radical having fewer than 6 carbon atoms and A represents one equivalent of a non-toxic anion can be produced by reacting a functional derivative of a 4-halo-3-sulfamoylbenzoic acid of the formula

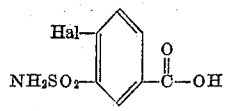

with a lower alkoxyamine of the formula $$NH_2\text{—}O\text{—lower alkyl}$$

or a hydrazine of the formula

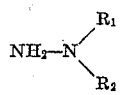

In the above formulas Hal has the hereinbefore mentioned significance and $R_1$ and $R_2$ both represent hydrogen or both lower alkyl or in combination with

represent a monocyclic heterocyclic radical having fewer than 6 carbon atoms. Examples of suitable functional derivatives of 4-halo-3-sulfamoylbenzoic acids of the above formula are the acid halides, activated esters, anhydrides and the like. The reaction is advantageously conducted in a solvent medium. Suitable solvents for the reaction are chloroform, toluene, benzene, dioxane or the hydrazine employed in the reaction. The preferred solvent medium is dioxane or a concentrated aqueous solution of the hydrazine employed in the reaction. The hydrazine or alkoxyamine is preferably employed in excess of that required to convert the carboxylic acid derivative to the novel compounds of the invention. Where the functional derivative of the 4-halo-3-sulfamoylbenzoic acid is the acid halide such as e.g. the acid chloride, the reaction is preferably conducted at around or less than room temperature. Where the functional derivative is an activated ester such as e.g. the cyanomethyl ester, the reaction is favored by temperatures in excess of room temperature and preferably conducted at temperatures between 50 and 150° C.

A number of functional derivatives of the 4-halo-3-sulfamoylbenzoic acids of the above formula suitable as starting materials for use in this process can be prepared in accordance with the methods set forth in the specification of our co-pending applicaiton Serial No. 27,538, filed on even date herewith.

Compounds of the invention wherein X represents

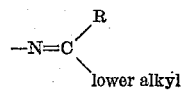

can be produced by reacting a 4-halo-3-sulfamoylbenzoic acid hydrazide of the formula

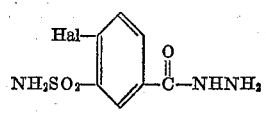

with a lower molecular weight aliphatic aldehyde or ketone such as acetone, methyl ethyl ketone, acetaldehyde, and the like. In the above formulas Hal and R have the hereinbefore mentioned significance. Preferred lower alkyl radicals are methyl, ethyl or propyl. This reaction can be conducted by heating the hydrazide of the above formula with the selected aldehyde or ketone, suitably by employing an excess of the latter reagent as a reaction solvent. The reaction is brought to substantial completion by heating the reactants at about 50–100° C., although substantial conversion to the desired reaction product takes place at a lower temperature.

Compounds of the invention having the formula

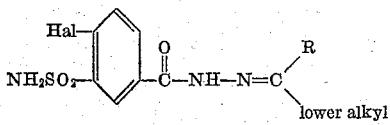

can be hydrogenated, by chemical or catalytic means, to produce the compounds of the invention wherein X represents

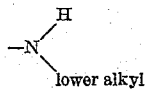

or

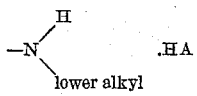

In the above formulas Hal and R have the aforementioned significance and A represents one equivalent of a non-toxic anion. As is stated above the hydrogenation can be accomplished by chemical or catalytic means. The reduction is preferably carried out using an alkali metal hydride such as e.g. sodium borohydride as the reductant in a solvent medium. Some of the solvents which can be used for this reaction are N,N-dimethylformamide, N,N-dimethylacetamide, tetrahydrofuran and the like. The relative amount of sodium borohydride used in this process can be varied within rather wide limits, but it is preferable in all cases to use more than the theoretical amount necessary to bring about the reduction. After the reaction with sodium borohydride is carried out, the excess sodium borohydride is decomposed by the addition of an aqueous mineral acid solution such as e.g. aqueous hydrochloric acid.

The hydrogenation can also be accomplished by catalytic means employing a suitable nickel or noble metal catalyst in a solvent medium. Some examples of solvents suitable for this purpose are methanol, ethanol and the like. The pressure, temperature and time required for the reaction vary with the activity of the catalyst employed.

The novel 4-halo-3-sulfamoylbenzoic acid derivatives of the invention are useful as diuretics. They have the property of augmenting the urine volume together with cation and chloride ion excretion. They can be administered orally. A suitable oral daily dose of the compounds of the invention is between about 0.5 and 10 mg. per kg. of body weight. For oral administration, the products of the invention can be combined with either a solid or liquid carrier or diluent and made available in such conventional vehicles as tablets, capsules, powders, aqueous and non-aqueous suspensions and solutions in varying amounts. For convenience in symptomatically adjusting the dosage in accordance with the requirement of the individual patient, the dosage forms are preferably prepared so that each unit will contain 10, 50, 100 or 250 mg. of the active ingredient.

The invention is illustrated, but not limited, by the following examples:

Example 1

5.0 g. of 4-chloro-3-sulfamoylbenzoyl chloride is added to 10.0 g. of hydrazine hydrate in 35 ml. of chilled water and the reaction mixture allowed to stand overnight. The pH of the reaction mixture is then adjusted to 7.5 with glacial acetic acid and the 4-chloro-3-sulfamoylbenzoic acid hydrazide collected by filtration; M.P. 211–212° C. after recrystallization from water.

Example 2

5.5 g. of 4-chloro-3-sulfamoylbenzoic acid cyanomethyl ester is added portionwise with stirring to 15.0 ml. of 85% hydrazine hydrate. Stirring is continued an additional 30 minutes and the reaction mixture diluted with 15.0 ml. of water. The mixture is then cooled to 0–5° C., the pH adjusted to 7.5 with concentrated hydrochloric acid, and the 4-chloro-3-sulfamoybenzoic acid hydrazide collected by filtration, washed with water, and dried; M.P. 210–212° C.

Example 3

2.7 g. of 4-chloro-3-sulfamoylbenzoic acid cyanomethyl ester is added portionwise with stirring to 10 ml. of unsymmetrical dimethylhydrazine. The reaction mixture is allowed to stand at room temperature for 3 hours and the excess dimethylhydrazine evaporated in vacuo. The residue is triturated with ether, the ethereal layer decanted and the residue dissolved in 10.0 ml. of water. The pH of the aqueous solution is adjusted to 7.5 to 8.0 with 5 N hydrochloric acid and the 4-chloro-3-sulfamoylbenzoic acid $N^2,N^2$-dimethylhydrazide collected by filtration; M.P. 185–188° C. after recrystallization from water.

Similarly, by substituting 2.7 g. of 4-chloro-3-sulfamoylbenzoic acid methoxy methyl ester for 2.7 g. of 4-chloro-3-sulfamoylbenzoic acid cyanomethyl ester in the above procedure the same product is obtained.

Example 4

10.0 g. of 4-bromo-3-sulfamoylbenzoic acid cyanomethyl ester is added portionwise to a mixture of 20.0 g. of hydrazine hydrate in 20 ml. of chilled water and the reaction mixture allowed to stand overnight at room temperature. The pH of the reaction mixture is adjusted to between 7.5 and 8.0 with glacial acetic acid and the 4-bromo-3-sulfamoylbenzoic acid hydrazide collected by filtration; M.P. 202–203° C. after recrystalliztaion from water.

4-bromo-3-sulfamoylbenzoic acid hydrazide p-toluenesulfonate is obtained by dissolving 4-bromo-3-sulfamoylbenzoic acid hydrazide in absolute ethanol and adding an ethanolic solution of p-toluenesulfonic acid.

Example 5

10 g. of 4-bromo-3-sulfamoylbenzoic acid cyanomethyl ester is added to 20 ml. of unsymmetrical dimethylhydrazine. The reaction mixture is heated at reflux for 2 hours, and the excess hydrazine evaporated in vacuo. The residue is dissolved in 25 ml. of water and neutralized with 5N hydrochloric acid. The gummy product which separates is dissolved in 15 ml. of ethanol and the alcoholic solution dried over anhydrous magnesium sulfate. 2 ml. of isopropanol saturated with hydrochloric acid and is then added to the dried alcoholic solution and the 4-bromo-3-sulfamoylbenzoic acid $N^2,N^2$-dimethylhydrazide hydrochloride which separates collected by filtrataion; M.P. 233–235° C.

The 4-bromo-3-sulfamoylbenzoic acid $N^2,N^2$-dimethylhydrazide is obtained by dissolving the hydrochloride in 5 parts of water and adjusting the pH to 8.0 with 1 N ammonium hydroxide; M.P. 183–184° C. after recrystallizaiton from water.

Example 6

3.5 ml. of unsymmetrical diethylhydrazine is added to a stirred refluxing mixture of 4.1 g. of 4-chloro-3-sulfamoylbenzoic acid cyanomethyl ester dissolved in 13.0 ml. of dioxane. Stirring is continued and the reaction mixture allowed to react at reflux overnight. The reaction mixture is then allowed to cool and the 4-chloro-3-sulfamoylbenzoic acid $N^2,N^2$-diethylhydrazide which separates on cooling is collected by filtration; M.P. 184–186° C. after recrystallization from a dioxane.

4-chloro-3-sulfamoylbenzoic acid $N^2,N^2$-diethylhydrazide citrate is obtained by dissolving 4-chloro-3-sulfamoylbenzoic acid hydrazide in absolute dioxane and adding an ethanolic solution of citric acid.

Example 7

3.5 ml. of unsymmetrical diethylhydrazine is added to a stirred refluxing mixture of 4.3 g. of 4-bromo-3- sulfamoylbenzoic acid cyanomethyl ester dissolved in 15.0 ml. of dioxane. Stirring is continued and the reaction mixture allowed to react at reflux overnight. The reaction mixture is allowed to stand at room temperature and the 4-bromo-3-sulfamoylbenzoic acid $N^2,N^2$-diethylhydrazide which separates is collected by filtration and dried in vacuo at 50° C.

Example 8

3.0 g. of 4-chloro-3-sulfamoylbenzoic acid hydrazide is added with stirring to 50 ml. of acetone. The reaction mixture is heated on a steam bath for 5 minutes, cooled, and the 4-chloro-3-sulfamoylbenzoic acid isopropylidene hydrazide collected by filtration and dried; M.P. 250–252° C.

Similarly, by substituting 50 ml. of acetaldehyde for the 50 ml. of acetone, 4-chloro-3-sulfamoylbenzoic acid ethylidene hydrazide is obtained.

Example 9

5.0 g. of 4-bromo-3-sulfamoylbenzoic acid hydrazide is added with stirring to 50.0 ml. of methyl ethyl ketone. The reaction mixture is heated on a steam bath for 5 minutes, cooled, and the 4-bromo-3-sulfamoylbenzoic acid 2-butylidene hydrazide collected by filtration and dried in vacuo at 60° C.

Similarly, by substituting 50 ml. of acetaldehyde for the 50.0 ml. of methyl ethyl ketone in the above procedure, 4-bromo-3-sulfamoylbenzoic acid ethylidene hydrazide is obtained.

Example 10

10.0 g. of 4-chloro-3-sulfamoylbenzoyl chloride is added to a mixture at 0–5° C. of an aqueous solution of 6.3 g. of methoxyamine hydrochloride and 3.0 g. of sodium hydroxide in 30 ml. of water. The reaction mixture is allowed to stand at room temperature for 2 hours and the 4-chloro-3-sulfamoylbenzohydroxamic acid methyl ester is collected by filtration; M.P. 232–234° C. after recrystallization from 50% equeous ethanol.

The following compounds can also be prepared by reaction, in the manner described, of a 4-halo-3-sulfamoylbenzoyl chloride and the corresponding alkoxyamine:

4-bromo-3-sulfamoylbenzohydroxamic acid methyl ester
4-bromo-3-sulfamoylbenzohydroxamic acid ethyl ester
4-chloro-3-sulfamoylbenzohydroxamic acid propyl ester

Example 11

4.1 g. of 4-chloro-3-sulfamoylbenzoic acid cyanomethyl ester and 3.0 g. of N-aminomorpholine are refluxed with stirring for 4 hours in 10 ml. of dioxane. Refluxing is then interrupted and the reaction mixture cooled to ice bath temperature. The 4-chloro-3-sulfamoyl-N-morpholinobenzamide which separates is collected by filtration, washed with a small quantity of dioxane and dried in vacuo at 60° C.; M.P. 274–276° C. after recrystallization from an aqueous N,N-dimethylformamide mixture.

The following compounds can also be prepared by reaction, in the manner described, of a 4-halo-3-sulfamoylbenzoic acid cyanomethyl ester and the corresponding N-aminoheterocyclic compound:

4-bromo-3-sulfamoyl-N-morpholinobenzamide
4-chloro-3-sulfamoyl-N-piperidinobenzamide
4-chloro-3-sulfamoyl-N-pyrrolidinobenzamide
4-bromo-3-sulfamoyl-N-pyrrolobenzamide

Example 12

1.4 g. of sodium borohydride is added to a mixture of 3.0 g. of 4-chloro-3-sulfamoylbenzoic acid isopropylidene hydrazide and 4.0 g. of calcium iodide in 200 ml. of tetrahydrofuran. The reaction mixture is stirred overnight at room temperature. Stirring is discontinued and the solvent evaporated in vacuo. The residue is triturated with dilute aqueous hydrochloric acid and the pH of the mixture adjusted to between 7.5 and 8.0. The 4-chloro-3-sulfamoylbenzoic acid, $N^2$-isopropylhydrazide which separates is collected by filtration and dissolved in 15 ml. of 1 N sodium hydroxide solution. The alkaline solution is neutralized with 5 N hydrochloric acid and the 4-chloro-3-sulfamoylbenzoic acid $N^2$-isopropylhydrazide which separates is collected by filtration; M.P. 187–189° C. after recrystallization from water.

The following compounds can also be prepared by reaction, in the manner described, of the corresponding 4-halo-3-sulfamoylbenzoic acid $N^2$-alkylidene hydrazide:

4-chloro-3-sulfamoylbenzoic acid $N^2$-ethyl hydrazide
4-bromo-3-sulfamoylbenzoic acid $N^2$-ethyl hydrazide
4-chloro-3-sulfamoylbenzoic acid $N^2$-ethyl hydrazide hydrochloride
4-bromo-3-sulfamoylbenzoic acid $N^2$-ethyl hydrazide p-toluenesulfonate

What is claimed is:
1. A compound of the formula

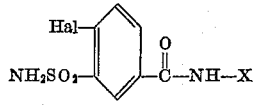

wherein Hal is selected from the group consisting of bromine and chlorine and X is selected from the group consisting of lower alkoxy,

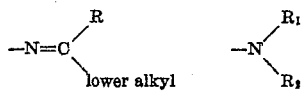

and

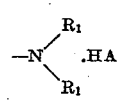

wherein R is a member of the class consisting of hydrogen and lower alkyl; $R_1$ and $R_2$ are members of the group consisting of hydrogen and lower alkyl; $R_1$ and $R_2$ in combination are members of the group consisting of alkylene radicals of fewer than 6 carbon atoms and oxydialkylene radicals of fewer than 6 carbon atoms; and A represents one equivalent of a non-toxic pharmaceutically-acceptable anion.

2. A compound of the formula

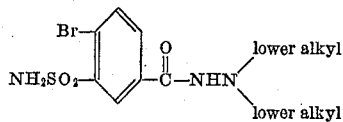

3. Non-toxic pharmaceutically-acceptable acid addition salts of 4-bromo-3-sulfamoylbenzoic acid $N^2,N^2$-di-lower alkyl substituted hydrazides.

4. A compound of the formula

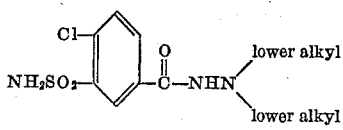

5. Non-toxic pharmaceutically-acceptable acid addition salts of 4-chloro-3-sulfamoylbenzoic acid $N^2,N^2$-di-lower alkyl substituted hydrazides.

6. 4-bromo-3-sulfamoylbenzoic acid $N^2,N^2$-dimethylhydrazide.

7. 4-chloro-3-sulfamoylbenzoic acid $N^2,N^2$-dimethylhydrazide.

8. 4-bromo-3-sulfamoylbenzoic acid $N^2,N^2$-diethylhydrazide.

9. 4-chloro-3-sulfamoylbenzoic acid $N^2,N^2$-diethylhydrazide.
10. 4-bromo-3-sulfamoylbenzoic acid hydrazide.
11. 4-chloro-3-sulfamoylbenzoic acid hydrazide.

References Cited in the file of this patent

UNITED STATES PATENTS

| | | |
|---|---|---|
| 2,349,912 | Orthner et al. | May 30, 1944 |
| 2,910,488 | Novello et al. | Oct. 27, 1959 |
| 2,923,714 | Gardner et al. | Feb. 2, 1960 |

OTHER REFERENCES

Ullmann: American Chemical Journal, vol. 16, pp. 535–543 (1894).

Noller: "Chemistry of Organic Compounds," 1st ed., W. B. Saunders Co., Philadelphia, Pa., p. 208 (1952).